Nov. 8, 1949  H. DRAKE ET AL  2,487,427
DOORSTOP
Filed Oct. 1, 1946
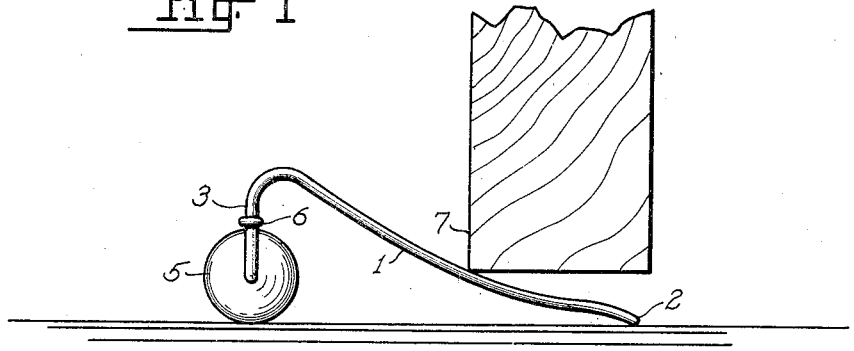
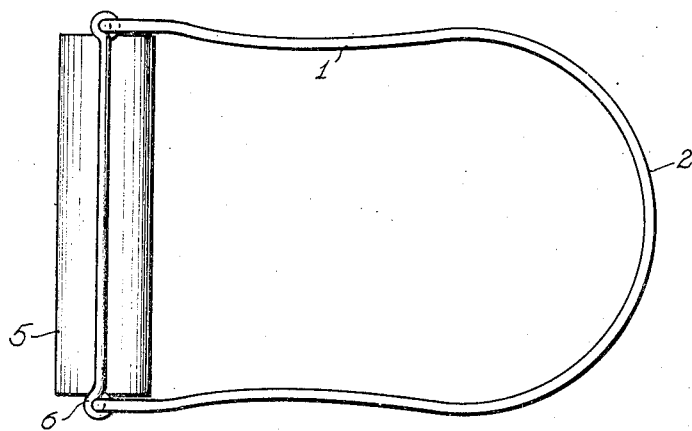
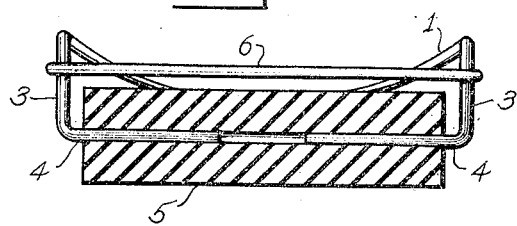
Inventors
Hallard Drake and
Frances R. Drake
By
Attorneys Patented Nov. 8, 1949

2,487,427

UNITED STATES PATENT OFFICE 2,487,427

DOORSTOP

Hallard Drake and Frances R. Drake, Chicago, Ill.

Application October 1, 1946, Serial No. 700,450

1 Claim. (Cl. 292—343)

This invention relates to an improved and inexpensive door stop which is designed to hold doors, gates and the like in any desired position.

Door stops presently known usually present one or more of the following disadvantages: of marring the door or the underlying floor, of being expensive to construct, of being inconvenient to place in position, of failing to stay in the desired position, or of being in the way and easily mislaid when not in use.

It is an object of our invention to provide a novel door stop which is inexpensive, efficient, convenient to use, durable, and which does not mar the door or the floor when in use. It is a further object to provide a door stop which may be hung on the door knob when not in use and which consequently is not underfoot and is not easily misplaced. Still other objects will become apparent from an inspection of the accompanying drawing and from the description of our invention which follows.

Our door stop consists of an inclined wire loop having its arms bent downwardly at its upper end and then inwardly to engage a short length of rubber tubing. The arms are maintained in proper spaced relationship just above the rubber tubing by means of a wire cross bar. In the drawing, Figure 1 shows a side elevation of the door stop in operative engagement with a door, and illustrates the manner in which the door is held by the stop.

Figure 2 is a plan view of the door stop.

Figure 3 is a front elevation showing the rubber tubing in section to illustrate the manner in which it is attached.

As will be observed from the drawing, the door stop comprises a rubber tubing 5 adapted to frictionally engage a floor adjacent a door 7, and a wedge projecting longitudinally from said tubing and connected thereto for engaging the bottom edge of said door. The wedge consists of a single piece of wire 1 which is U-shaped in its mid-section to form a loop or bight 2, which rests on the floor when the stop is in use. The two legs of this loop extend in a slightly concave fashion and then bend downwardly, forming parallel vertical sections or runs 3 which make acute angles with the plane of the loop. At the end of the vertical sections, the arms are bent inwardly, toward one another, to provide horizontal runs 4 for the rubber tubing 5. The cross bar 6 is a separate piece of wire which is disposed just above the rubber tubing and the ends of which are bent around the vertical sections 3 of the looped wire in order to hold the cross bar in position.

When it is desired to hold the door in a given position, the loop portion of the stop is slid under the edge of the door 7 as shown in Figure 1. The rubber tubing 5 then rests on the floor and provides frictional resistance to any tendency for the door to close. When the door is pushed or blown in the direction of the tubing, it engages the inclined wire arms of the stop and, by reason of the incline, exerts a downward force on the stop which increases the frictional resistance afforded by the rubber tubing, and effectively prevents further motion of the door.

Our door stop may be placed in position simply by dropping it to the floor and sliding it with the foot against the door. Similarly it may easily be removed by sliding it out with the foot. When the stop is not in use, we find it convenient to hang it by the loop from the door knob, in which position it is not in the way and does not interfere with the knob, but is instantly available when wanted.

As will be obvious, the stop may be made of any suitable size, and is very simple and inexpensive to construct. Use of the horizontal section of rubber tubing insures adequate resistance to motion of the door yet prevents any marring of the floor.

We claim:

In a door stop, the combination with a rubber tubing adapted to frictionally engage a floor adjacent a door, of a wedge projecting longitudinally from said tubing and connected thereto for engaging the bottom edge of said door, said wedge embodying a single piece of wire bent in a form of a U and having its bight at a lower level than the legs thereof, the bight resting upon the floor and a portion of the legs adjacent to the bight engaging the bottom of the door, each leg adjacent its end being bent downwardly so as to form a vertical run and then inwardly so as to form a horizontal run, the horizontal runs being arranged in aligned facing relation with respect to each other and being seated in said rubber tubing.

HALLARD DRAKE.
FRANCES R. DRAKE.

REFERENCES CITED

The following references are of record in the file of this patent:

UNITED STATES PATENTS

| Number | Name | Date |
|---|---|---|
| 165,856 | Mullane | July 20, 1875 |
| 535,507 | McGrory | Mar. 12, 1895 |
| 1,423,034 | Scholl | July 18, 1922 |
| 1,636,627 | Craven | July 19, 1927 |
| 2,218,780 | Andrews | Oct. 22, 1940 |